United States Patent Office 3,770,830
Patented Nov. 6, 1973

3,770,830
PROCESS OF PREPARING STABILIZED AQUEOUS FORMALDEHYDE SOLUTIONS
Cesare Reni and Luigi Lugo, Milan, Italy, assignors to Società Italiana Resine S.p.A., Milan, Italy
No Drawing. Filed Dec. 7, 1967, Ser. No. 688,706
Claims priority, application Italy, Dec. 14, 1966, 31,072/66, Patent 783,293
Int. Cl. C07c 47/04
U.S. Cl. 260—606                           5 Claims

ABSTRACT OF THE DISCLOSURE

The invention relates to a process for stabilizing an aqueous formaldehyde solution comprising adding to the initially unstabilized aqueous formaldehyde solution a stabilizer precursor and heating the precursor containing formaldehyde solution to a temperature of at least 50° C. The stabilizer precursor is defined as being a substance which is not effective as a stabilizer per se but, when it is present in a formaldehyde solution, the solution becomes stabilized when subjected to a heat treatment at temperatures exceeding 50° C. Preferably the precursor is a triazine resin such as a melamine and/or benzoguanamine resin.

It is known that aqueous formaldehyde solutions are not stable on storage and become turbid and over a period formaldehyde separates out in increasing amounts the higher the concentration of the solution and the lower the temperature. In order to prevent this undesirable process heated tanks or stabilizers can be employed. In this connection it is known in the art to employ methanol as a stabilizer. However this must be utilized in a highly concentrated form in order to give a satisfactory stabilizing effect. For example, the necessary methanol percentage for stabilizing an aqueous 36% by weight formaldehyde solution varies with the storage temperature so that, depending upon the period of the year, quantities from about 6 to 13% must be used.

A number of further compounds have been proposed as stabilizers, such as melamine, phenol, hydrocyanic acid, urea and derivatives thereof, hydrazine, hydroxylamine, phosphoric acid or compounds of the polyvinyl alcohol type or cellulose derivatives. However, none of these compounds exert a stabilizing action over a sufficiently long period at temperatures below about 5° C. and they must generally be employed in a highly concentrated form, thus causing technical difficulties, inasmuch as the formaldehyde solutions thus stabilized is no longer useful for all uses for which it is normally intended. A further drawback is the cost of the above substances and the quantities to be utilized.

Other compounds such as substituted guanamines were utilized in order to prevent precipitation of paraformaldehyde from aqueous formaldehyde solutions. However, these highly expensive compounds give rise to various drawbacks in the subsequent use of the products thus stabilized. For instance, when a formaldehyde thus stabilized is used for the synthesis of polymeric materials useful as paints, finished products are obtained which give colour effects under the action of ultraviolet light.

An object of the invention is to provide a method by which aqueous, possibly highly concentrated formaldehyde solutions can be obtained, which are stable over long periods at temperatures which may reach —10° C. or less.

A further object of the invention is to provide a method for obtaining stabilized aqueous formaldehyde solutions such that they can be directly utilized without the above described difficulties due to large quantities of stabilizer being present as impurity.

It has now been found that aqueous formaldehyde solutions, which are stable over a wide range of temperatures, can be obtained by adding a substance which will be referred to as a stabilizer precursor and heating to a temperature of at least 50° C. A "stabilizer precursor" as defined herein is a substance which is not an effective stabilizer per se, but when it is present in a formaldehyde solution the solution becomes stabilized when subjected to a heat treatment at temperatures exceeding at least 50° C. The invention includes aqueous solutions when stabilized by this process.

The resins which can be usefully employed as precursors are triazine resins, among which condensation products of aldehydes, such as formaldehyde or acetaldehyde with melamine and/or benzoguanamine were found particularly useful. These resins can be utilized as a pure condensation product (obtained from aldehyde and melamine and/or benzoguanamine in an alkali medium, of a melting point between 100 and 150° C.) or in their etherified (e.g. by butanol) form, that is, practically deprived of free methylol groups. The quantity of resin ranges between 0.005 and 1.0%, preferably 0.05 to 0.2% by weight, the range of between 0.08 to 0.12% being especially preferred.

In order to obtain the desired stabilizing effect the aqueous formaldehyde solution containing the precursor in the quantities mentioned above is heated to a temperature of at least 50° C., preferably not below 60°, and preferably for a period of from 1–4 hours. The highest temperatures to which the precursor containing formaldehyde solution can be subjected are determined by the boiling temperature of the solution.

The aqueous formaldehyde solution is preferably admixed with the resin dissolved in an alcoholic solvent, such as methanol. This process, which yields formaldehyde solutions that are stable at temperatures down to —10° C. or less, is advantageous in that very small quantities of additives are sufficient, the latter being moreover easily available in the trade. Moreover, the process is easily suitable for commercial use, since the alcohol solubilized resins can be supplied to the formaldehyde absorbing columns.

The following experimental examples illustrate the invention.

In the experimental tests the solutions are submitted, after heat treatment, to a storage test by maintaining them during 12 hours at a temperature of —10° C. This test is considered to be positive when the formaldehyde solution is free from any deposit body after the said period of time. It should be noted that formaldehyde solutions which do not separate paraformaldehyde under the testing conditions are stable at room temperature for a number of months.

EXAMPLE 1

The precursor was prepared by condensing aqueous formaldehyde and benzoguanamine in a molar ratio of 3 to 1 by heating them for 2 hours at about 90° C. in a medium of pH 8.3 containing sodium carbonate. The resin obtained was separated and was washed and dried in vacuum at 50° C. to give a product having a melting point of 108° C.

1,000 g. of an aqueous 36% formaldehyde solution of pH 3 were then admixed with 0.9 g. of the benzoguanamine-formaldehyde resin dissolved in methanol, obtained by the above described method. The solution was then heated for 2 hours at 70° C., and then allowed to cool and submitted to the previously described storage test. The result of the test was positive.

EXAMPLE 2 (COMPARATIVE)

The precursor was the same as in Example 1, however, no heating of the resin containing aqueous formaldehyde solution was effected. The result of the test was negative.

EXAMPLE 3 (COMPARATIVE)

The procedure was as in Example 1, 1% by weight of resin being added without, however, heating the aqueous formaldehyde solution. The result of the test was negative.

EXAMPLE 4

1,000 g. aqueous 36% formaldehyde solution of pH 3 was treated for 2 hours at 70° C. in the presence of 65% butanol solution of a condensation product of formaldehyde and benzoguanamine etherified by butanol, known in the trade by the name of Siramin.

The solution was subjected after cooling to the storage test which gave a positive result. The formaldehyde solutions stabilized as above were utilized in the synthesis of melamine resins. The resulting resinous products did not show any colour effect by the action of the ultraviolet light.

What we claim is:

1. A process for stabilizing aqueous formaldehyde solutions down to temperatures of −10° C. comprising the steps of:
   (a) adding to an aqueous formaldehyde solution from 0.005 to 1.0% of a condensation product selected from the group consisting of
      (i) a methanol solution of a resinous condensation product soluble in said methanol having a melting point of from 100 to 150° C. obtained by the condensation, in an alkaline medium, of formaldehyde with a member of the group consisting of melamine and benzoguanamine, and
      (ii) a butanol solution of a resinous condensation product soluble in said butanol, obtained as defined in (i) and which has been etherified by butanol, thereby being substantially lacking in free methylol groups,
   (b) heating the aqueous formaldehyde solution containing the condensation product from step (a) at a temperature in the range of from at least 50° C. to a temperature which at highest is the boiling temperature of the aqueous formaldehyde solution for a period of time of from 1 to 4 hours.

2. A process as claimed in claim 1 wherein the amount of said resinous product which is added is from 0.05 to 0.2% by weight with respect to the aqueous formaldehyde solution.

3. A process as claimed in claim 1 wherein the amount of said resinous product which is added is from 0.08 to 0.12% by weight with respect to the aqueous formaldehyde solution.

4. The process as claimed in claim 1 wherein said product from step (a) is heated to a temperature of at least 60° C.

5. The process as claimed in claim 1 wherein said formaldehyde solution has a concentration of about 36%.

References Cited

UNITED STATES PATENTS

| | | | |
|---|---|---|---|
| 3,423,467 | 1/1969 | Dakli et al. | 260—606 |
| 2,197,357 | 8/1940 | Widmer et al. | 260—72 |

FOREIGN PATENTS

| | | | |
|---|---|---|---|
| 1,017,698 | 1/1966 | Great Britain | 260—606 |
| 838,097 | 6/1960 | Great Britain | 260—606 |
| 6415100 | 6/1965 | Netherlands | 260—606 R |

LEON ZITVER, Primary Examiner

R. H. LILES, Assistant Examiner

U.S. Cl. X.R.

260—67.6 R